United States Patent [19]

Richards, Sr.

[11] 4,453,519
[45] Jun. 12, 1984

[54] THROTTLE ACTUATOR

[76] Inventor: Fred F. Richards, Sr., 6837 Chevy Chase, Dallas, Tex. 75225

[21] Appl. No.: 321,905

[22] Filed: Nov. 16, 1981

[51] Int. Cl.³ ............................................. F02D 31/00
[52] U.S. Cl. .................................................. 123/378
[58] Field of Search ............... 123/350, 352, 360, 376; 180/175–177

[56] References Cited

U.S. PATENT DOCUMENTS

| | | | |
|---|---|---|---|
| 3,070,185 | 12/1962 | Fales | 180/176 |
| 3,198,280 | 8/1965 | Van Ostrom | 180/177 |
| 3,556,245 | 1/1971 | Radin | 123/360 |
| 4,286,685 | 9/1981 | Rudolph et al. | 123/353 |

FOREIGN PATENT DOCUMENTS 55-96337  7/1980  Japan .................................. 123/352

Primary Examiner—William A. Cuchlinski, Jr.

[57] ABSTRACT

A throttle actuator for a vehicle having a source of compressed air. A power wall having a constant pressure applied to one side and means for applying or dumping pressure from the other side. A rod extending from the power wall through seals to a chain which is coupled to a throttle arm. The power wall return spring and the throttle arm return spring respectively return the power wall and throttle arm to the closed throttle position. Said throttle actuator comprising solenoid operated valves which control movement of said power wall upon demand by storing or dumping compressed air from one side of said power wall.

1 Claim, 2 Drawing Figures

THROTTLE ACTUATOR

BACKGROUND OF THE INVENTION

This invention relates to a servo mechanism which may be used in an automatic speed control system for a vehicle, such as a heavy diesel truck, having a source of air pressure aboard.

Electrical speed sensing devices permit accurate speed measurements and are capable of providing signals which call upon the actuators to move in one direction or another depending upon the measured speed. When such electrical speed sensing devices are coupled to a proper actuator a speed control for a vehicle can result. The reliability, response and dependability of the speed control system depends greatly upon the actuator.

One problem in providing a speed control system on a diesel truck as compared with a common passenger car is that trucks are relatively underpowered and do not have the capability to accelerate rapidly in order to maintain a constant rate of speed under varying load and road conditions.

Common passenger car speed controls utilize the vacuum created in the intake manifold of an engine to provide power for operating a throttle mechanism. The vacuum thus produced varies with engine load and atmospheric pressure so is not a reliable power source for use in more sophisticated apparatus.

Attempts have been made to solve the problem of vacuum powered actuators for use on vehicle speed controls by applying vacuum from the intake manifold to one side of the servo diaphram and applying pressure from the exhause manifold to the other side of the diaphram, but due to the construction of a diesel engine and the inherent complications of installation there has been little satisfaction derived from this attempted solution to the vacuum powered servo problem.

One system has been devised whereby the compressed air available on most heavy trucks is used to operate a hydraulic cylinder which, in turn, operates an engine throttle. This system is subject to response variation due to temperature and air/oil polution. It is also complicated when compared to the vacuum-servo actuated systems.

Speed control of engines by means of a mechanical governor has entailed complicated apparatus and have exhibited limited sensitivity.

SUMMARY OF THE INVENTION

Basically, this invention is a vacuum-servo in which the cavities normally opened to a vacuum have been opened to the atmosphere and those cavities which normally open to the atmosphere have been opened to compressed air. The advantage of this invention is that the ratio of compressed air to atmosphere can be higher and far more constant than the ratio of atmosphere to the vacuum supplied by the intake manifold of an engine.

OBJECTS OF THE INVENTION

Therefore, it is an object of this invention to provide an air powered actuator for use on heavy diesel powered trucks which, when coupled with and electronic speed-sensing device will operate as an automatic speed control.

Another object of this invention is to provide an actuator for a vehicle speed control which is not dependent upon vacuum for power.

A further object of this invention is to provide a throttle actuator for a vehicle speed control which is not affected by changes in atmospheric pressure.

Another object of this invention is to provide a throttle actuator for a vehicle speed control with a rapid response.

Another object of this invention is to provide a throttle actuator for a vehicle speed control which responds to signals from an electrical sensing device and such response is not affected by varying loads or performance of the engine to which it is attached.

An important object of this invention is to provide an actuator member which, when coupled to an electronic sensing and processing device, will provide an engine speed control for a truck having a source of air pressure, so that the truck can maintain a pre-determined speed regardless of changes in atmospheric pressure, temperature, or humidity.

Other objects and advantages of the invention will become apparent from the following description and from the accompanying drawings.

DETAILED DESCRIPTION

Figure 1:
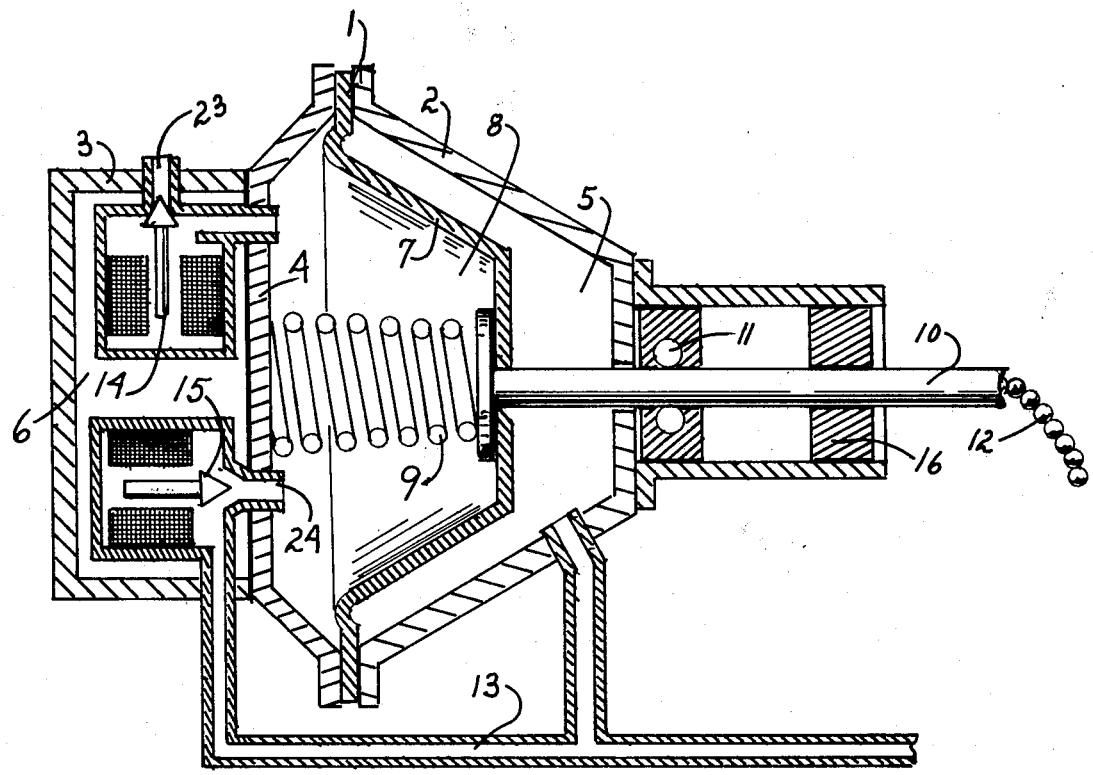
FIG. 1 is a cross section view of a typical airpowered throttle control actuator.

It is understood that the invention is not limited in its application to the details of construction and arrangement of parts illustrated in the accompanying drawings, since the invention is capable of other embodiments and of being practiced and carried out in various ways. Also, it is understood that the phraseology or terminology employed herein is for the purpose of description and not limitation.

Referring now to the drawings in detail wherein like reference numerals indicate like parts throughout the several figures, the reference Number 1 indicates a package containing the several parts of the invention and consists of a front section 2 and a rear section 3. A dividing member 4 divides the package 1 into a front chamber 5 and a rear chamber 6. Within front chamber 5 is a power wall 7 which is sealed at its outer edge to dividing member 4 thus creating inner chamber 8. Said power wall 7 forms a movable barrier between front chamber 5 and inner chamber 8.

Within inner chamber 8 a compression spring 9 is located to hold power wall 7 as far away from dividing member 4 as possible when the system is at rest.

A rod 10 extends from the center of the power wall 7 through a suitable seal 11 in front section 2, through a guide bearing 16 and is connected by a chain 12 to an engine throttle valve or other movable member. Chain 12 may take any of several well known forms so long as it enables power to be transmitted from the power wall 7 to such throttle valve or other movable member 19.

A normally closed valve 14 is located within rear chamber 6 and opens or closes a passageway 23 extending from inner chamber 8 to the atmosphere outside package 1. A normally open solenoid valve 15 is also located within rear chamber 6 and opens or closes a passageway 24 extending from conduit 13 to inner chamber 8.

Figure 2:
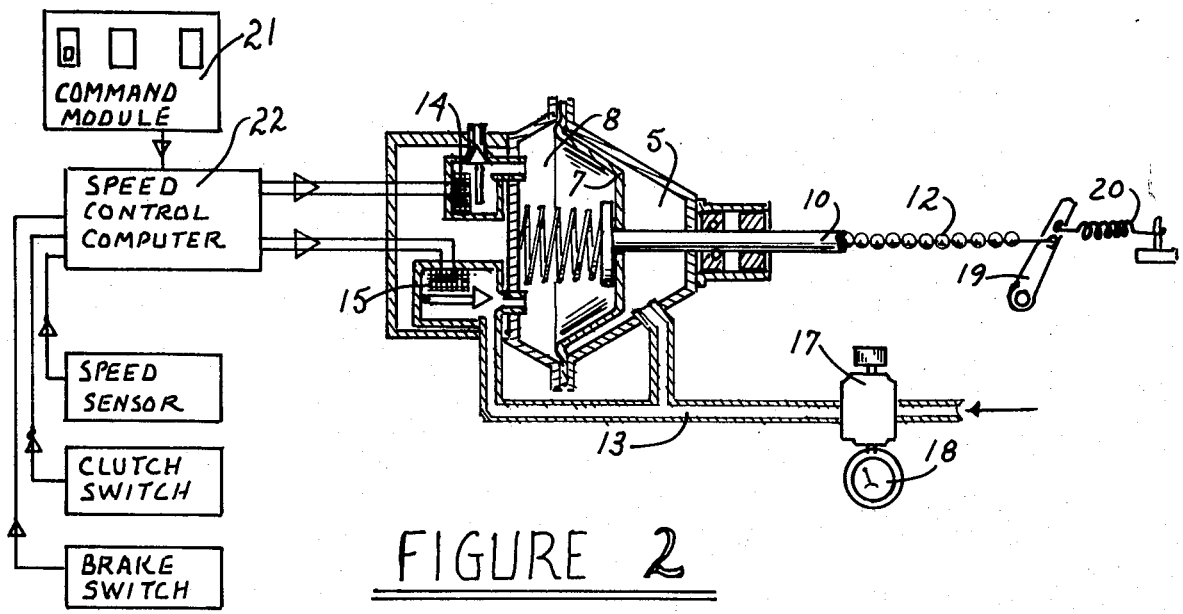
FIG. 2 is a diagrammatic illustration of a truck speed control system utilizing the teachings of my present invention.

In operation as a throttle actuator on a vehicle having a source of compressed air the invention is coupled to typical control elements as shown in FIG. 2. Compressed air from the compressed air source enters a pressure regulator 17 where pressure is reduced to 5 to 7 PSI as shown by pressure gauge 18. Low pressure air enters conduit 13 and is conducted to front chamber 5 and normally open solenoid valve 15.

Normally open solenoid valve 15 permits air to flow from conduit 13 into inner chamber 8 so pressure on both sides of power wall 7 is the same and compression spring 9 holds power wall 7 in position to permit spring 20 to close throttle lever 19.

When the truck operator closes the ON-OFF switch on command module 21 the speed control computer 22 is energized. After the truck has reached a predetermined speed the operator presses the SET switch on command module 21 to cause the speed control computer 22 to begin its functions of comparing the speed of the truck to the predetermined speed and sending signals to normally closed solenoid valve 14 and normally open solenoid 15 in accordance with the deviation of vehicle speed from the predetermined speed.

If the vehicle speed is slower than the predetermined speed currents go to both the normally closed solenoid valve 14 to open it and to normally open solenoid valve 15 to close it causing air in inner chamber 8 to be vented to atmosphere while preventing air from conduit 13 from entering inner chamber 8 thus enabling the compressed air in front chamber 5 to move the power wall 7 against compression spring 9 pulling chain 12 and opening throttle lever 19 to cause engine speed to increase and bring vehicle speed up to the predetermined level at which time the speed control computer removes current from normally closed solenoid valve 14 leaving current on normally open solenoid valve 15 thus closing all parts into inner chamber 8 and holding power wall 7 fixed.

If the vehicle speed becomes faster than the predetermined speed set in the speed control computer 22 by the operator no current is provided by the speed control computer to either normally closed solenoid valve 14 or normally open solenoid valve 15 thus enabling compressed air to flow through normally open solenoid valve 15 and become entrapped in inner chamber 8 equalizing the pressure on both sides of power wall 7 permitting compression spring 9 to slacken tension on chain 12 and allow spring 20 to pull throttle lever 19 towards a closed position. As soon as the vehicle slows to the predetermined speed the speed control computer 22 again supplies current to normally open solenoid valve 15 to close it and close all parts into inner chamber 8 thus holding power wall 7 fixed.

When the vehicle is moving at the predetermined speed power wall 7 will have pulled chain 12 to properly position throttle lever 19 and the speed control computer will provide a current to normally open solenoid valve 15 to close it thus entrapping air in inner chamber 8 to hold power wall 7 in a fixed position until vehicle speed changes and the computer either supplies or withholds current from the appropriate solenoid valves until the predetermined speed is reestablished at which time current is supplied to normally open solenoid valve 15 only. If the truck operator depresses either the clutch pedal or brake pedal the speed control computer will cut current from both the normally open solenoid valve 15 and the normally closed solenoid valve 14 causing the power wall 7 to quickly move to close the throttle lever 19 to reduce engine speed.

The system provides a speed control which is simple to construct, needs only a few components, is easily installed, and which rapidly responds to deviations of speed from a predetermined valve in a manner which is independent of changes in engine manifold pressures, atmospheric pressure or temperature.

Various changes and modifications may be made within the scope of the inventive concept.

REFERENCES CITED

U.S. Pat. No. 3,964,707, Larry O. Gray, Mar. 30, 1976
U.S. Pat. No. 3,978,837, Kirk-Erik Lundberg, Sept. 7, 1976
U.S. Pat. No. 4,056,157, Shoji Kawata, Nov. 1, 1977
U.S. Pat. No. 4,082,158, John A. Carol, Jr., Apr. 4, 1978
U.S. Pat. No. 4,286,685, Pamela Rudolph, Sept. 1, 1981
U.S. Pat. No. 2,835,237, R. H. Thorner, May 20, 1958
U.S. Pat. No. 2,372,274, A. F. Hoppe, Mar. 27, 1945.

What I claim is:

1. A speed control device for a vehicle having a compressed air source and an engine throttle means movable in two directions to increase or decrease vehicle speed comprising:
   a. a pressure bellows comprising a housing;
   b. a movable power wall dividing said housing into a first and second chamber;
   c. an output member connected at one end to said power wall and at the other end to said throttle means and which passes through said first chamber and a seal means in a outer wall of said housing;
   d. a compression spring positional in said second chamber, said spring connected at one end to said power wall and at the other end to said housing;
   e. means connected to said compressed air source to provide a constant air pressure to said first and second chambers;
   f. first valve means operatively connected to selectively communicate between said second chamber and said compressed air source;
   g. second valve means operatively connected to selectively communicate between said second chamber and the atmosphere;
   h. control means operatively connected to said first and second valve means to activate said valve means to produce a pressure differential between said first and second chambers to move said output member so as to maintain a preselected vehicle speed.

* * * * *